United States Patent [19]

Tu et al.

[11] 4,312,743
[45] Jan. 26, 1982

[54] FCC PROCESS USING CATALYST PRODUCED FROM USED FCC CATALYST

[75] Inventors: Hosheng Tu, Shorewood; William D. Schlueter, Oak Park, both of Ill.

[73] Assignee: UOP Inc., Des Plaines, Ill.

[21] Appl. No.: 179,908

[22] Filed: Aug. 20, 1980

Related U.S. Application Data

[62] Division of Ser. No. 59,938, Jul. 23, 1979, Pat. No. 4,261,861.

[51] Int. Cl.³ .............................................. C10G 11/05
[52] U.S. Cl. ...................................... 208/120; 208/74; 252/455 Z
[58] Field of Search ................................. 208/74, 120

[56] References Cited

U.S. PATENT DOCUMENTS

| | | | |
|---|---|---|---|
| 2,409,353 | 10/1946 | Giuliani et al. | 208/70 |
| 2,692,281 | 12/1954 | Leffer | 208/147 |
| 3,312,615 | 4/1967 | Cramer et al. | 208/120 |
| 3,392,110 | 7/1968 | Payne | 208/120 |
| 3,503,874 | 3/1970 | Michalko | 208/120 |
| 3,592,778 | 7/1971 | Vesely | 252/455 Z |
| 3,669,903 | 6/1972 | Bourguet et al. | 585/468 X |
| 3,692,864 | 9/1972 | White et al. | 585/277 |
| 3,696,023 | 10/1972 | Koch | 208/87 |
| 3,770,615 | 11/1973 | Blazek | 208/120 |
| 3,849,291 | 11/1974 | Owen | 208/78 |
| 3,926,778 | 12/1975 | Owen et al. | 208/74 |
| 3,929,668 | 12/1975 | Nelson et al. | 208/120 X |
| 3,939,058 | 2/1976 | Plank et al. | 208/120 |
| 4,001,106 | 1/1977 | Plank et al. | 208/75 |
| 4,100,219 | 7/1978 | Rodewald | 585/640 |

Primary Examiner—Andrew Metz
Assistant Examiner—G. E. Schmitkons
Attorney, Agent, or Firm—James R. Hoatson, Jr.; Louis A. Morris; William H. Page, II

[57] ABSTRACT

This invention comprises a process for cracking a hydrocarbon charge stock using a used FCC catalytic composite comprising a zeolitic crystalline aluminosilicate dispersed in a porous inorganic matrix. Particles of zealitic crystalline aluminosilicate having diameters less than the diameters of the pares of the composite are impregnated into the composite, preferably by contacting the composite with an aqueous slurry of the particles and then evaporating off the water of the slurry.

11 Claims, No Drawings

FCC PROCESS USING CATALYST PRODUCED FROM USED FCC CATALYST

This is a division of application Ser. No. 59,938, filed July 23, 1979, now U.S. Pat. No. 4,261,861, Apr. 14, 1981.

BACKGROUND OF THE INVENTION

1. Field of the Invention

The field of art to which the claimed invention pertains is the catalytic cracking of hydrocarbons. More specifically, the claimed invention relates to an FCC process using a used FCC catalytic composite that has been restored.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking process in which heavy petroleum hydrocarbon feed stocks boiling in excess of about 400° F. are converted to lower boiling hydrocarbons in the motor fuel boiling range by heating them in contact with an amorphous silica-alumina catalyst maintained in a fluidized state. While other composites comprising silica, e.g. silica-zirconia, silicamagnesia, etc., have been known to catalyze the cracking reaction, the silica-alumina composite has been by far the most widely accepted catalyst in the industry. More recently, improved catalysts having the capability of yielding greater proportions of high octane gasoline have been prepared by the inclusion of a finely divided zeolite, or crystalline aluminosilicate, either naturally occurring or synthetically prepared, within the amorphous silica-alumina matrix. Prior inventors have prepared, tested and compared hydrocarbon conversion catalysts comprising a finely divided crystalline aluminosilicate distributed in an amorphous silica matrix on the one hand, and in an amorphous silica-alumina matrix on the other hand. Examples of such catalysts are as described or claimed in U.S. Pat. Nos. 3,312,615; 3,392,110; 3,503,874; 3,592,778; 3,669,903; 3,696,023; 3,849,291; 3,926,778; 3,939,058; 4,001,106 and 4,100,219.

A common problem in the fluid catalytic cracking process is the gradual loss of the activity and selectivity of useful products, i.e. gasoline, for production of the cracking catalyst due to irreversible changes in the molecular or crystalline structure of the components of the catalyst. The regeneration section of the typical fluid catalytic cracking (FCC) unit effects removal of carbon and hydrocarbonaceous deposits acquired by the catalyst in the reaction section, but is unable to preclude and in fact causes or contributes to the aforementioned irreversible changes. This problem of loss of activity and selectivity is known to the art and there are numerous inventions that attempt to deal with it, such as the inventions of U.S. Pat. Nos. 3,926,778 and 3,929,668, both of which teach an expensive time consuming procedure comprising heat treatment of the spent catalyst at conditions more extreme than would be encountered in the typical regeneration section.

U.S. Pat. No. 3,770,615 teaches a method of increasing catalyst activity by adding a water-fluidized molecular sieve (FMS) slurry directly to the hot catalyst inventory of an FCC unit. The FMS contemplated by this reference has a particle size range of from about 60 to 200 microns which is similar to the size range of the typical FCC catalyst particles. The method of this reference yields a physical mixture of separate particles of fresh zeolite with the aged particles of FCC catalyst. This mixture will have an improved catalytic activity as compared to the aged FCC catalyst particles alone, but the mixture can achieve no improvement in selectivity with regard to certain desired products.

We have discovered a method of treating a used FCC catalyst with an FMS that achieves not only an increase in activity, but also in selectivity.

SUMMARY OF THE INVENTION

It is, accordingly, a broad objective of our invention to provide a process for cracking a hydrocarbon charge stock utilizing a catalytic composite comprising a used FCC molecular sieve catalyst, the activity and selectivity of which has been increased by a novel method.

In brief summary, our invention is, in one embodiment, a process for cracking a hydrocarbon charge stock which comprises contacting the charge stock at cracking conditions with a catalytic composite prepared by impregnating a regenerated used FCC catalytic composite comprising a first zeolitic crystalline aluminosilicate dispersed in a porous inorganic oxide matrix with particles of a second zeolitic crystalline aluminosilicate. The composite contains therein pores having diameters greater than the diameters of the particles of the second zeolitic crystalline aluminosilicate.

Other objectives and embodiments of our invention encompass details about composite ingredients, steps in the manufacture and chemicals and conditions used in such manufacture, all of which are hereinafter disclosed in the following discussion of each of the facets of our invention.

DESCRIPTION OF THE INVENTION

The catalyst composite of the present invention is intended to be used in a process for cracking a hydrocarbon charge stock at cracking conditions. The most common form of such a process is well known to the art as the fluid catalytic cracking process and is described in detail in numerous publications, such as U.S. Pat. Nos. 2,409,353; 3,692,864; and 2,698,281; to name just a few of the most basic of these publications.

In a typical FCC process flow, finely divided regenerated catalyst leaves the regeneration zone at a certain temperature and contacts a feedstock in a lower portion of a reaction riser zone. While the resulting mixture, which has a temperature of from about 600° to about 1000° F., passes up through the riser, conversion of the feed to lighter products and to coke deposited on the catalyst occurs. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone, known in the art as the main column, wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, countercurrently contacts the spent catalyst purging adsorbed and interstitial hydrocarbons from the catalyst. The spent catalyst containing coke leaves stripping zone and passes into a regeneration zone, where, in the presence of fresh regeneration gas and at temperature of from about 1150° to about 1400° F., combustion of coke produces regenerated catalyst having a carbon content of from about 0.01 to about 0.5 wt. % and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam. Regenerated catalyst which was separated from the flue gas is returned to the lower portion of the regeneration zone which is maintained as a dense bed of spent catalyst. Regenerated catalyst leaves this dense bed and, as previously mentioned, contacts the feedstock in a reaction zone.

The used FCC catalysts contemplated for use by this invention are the aluminosilicate or zeolite-containing catalysts. The aluminosilicate or zeolite will be dispersed in an amorphous porous inorganic oxide matrix. The pores of the composite as referred to in this invention exist in and throughout the matrix.

Zeolitic crystalline aluminosilicates occur both naturally or are synthesized. In hydrated form, the crystalline aluminosilicates generally encompass those zeolites represented by the Formula 1 below:

Formula 1

$$M_{2/n}O:Al_2O_3:wSiO_2:yH_2O$$

where "M" is a cation which balances the electrovalence of the aluminumcentered tetrahedra and which is generally referred to as an exchangeable cationic site, "n" represents the valence of the cation, "W" represents the moles of $SiO_2$, and "y" represents the moles of water. The generalized cation "M" may be monovalent, divalent or trivalent or mixtures thereof.

Crystalline aluminosilicates particularly useful comprise zeolites in either the X or Y form. The X zeolite in the hydrated or partially hydrated form can be represented in terms of mole oxides as shown in Formula 2 below:

Formula 2

$$(0.9\pm0.2)M_{2/n}O:Al_2O_3:(2.50\pm0.5)SiO_2:yH_2O$$

where "M" represents at least one cation having a valence of not more than 3, "n" represents the valence of "M", and "y" is a value up to about 9 depending upon the identity of "M" and the degree of hydration of the crystal. As noted from Formula 2 the $SiO_2/Al_2O_3$ mole ratio of X zeolite is $2.5\pm0.5$. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium, and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3

$$(0.9\pm0.2)M_{2/n}O:Al_2O_3:wSiO_2:yH_2O$$

where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying the exchangeable cationic sites in the zeolite may be replaced with other cations by ion exchange methods well known to those having ordinary skill in the field of crystalline aluminosilicates. Such methods are generally performed by contacting the zeolite or a base material containing the zeolite with an aqueous solution of the soluble salt of the cation or cations desired to be placed upon the zeolite. After the desired degree of exchange takes place the sieves are removed from the aqueous solution, washed and dried to a desired water content. By such methods the sodium cations and any non-sodium cations which might be occupying exchangeable sites as impurities in a sodium-X or sodium-Y zeolite can be partially or essentially completely replaced with other cations.

The zeolite-amorphous matrix FCC catalytic composite, as it is being used in the FCC process, suffers a gradual degradation in activity and selectivity for desired products which heretofore required a constant withdrawal and replacement of a quantity of the composite so as to maintain a minimum activity and selectivity of the catalyst inventory. In 1978, for example, it is estimated that in the United States petroleum refining industry about 260 million pounds of this composite was withdrawn from service actually creating a solid waste disposal problem, and for lack of any better solution, was disposed of as landfill. Our invention enables the converting of this liability to an asset by increasing the activity and selectivity of the otherwise waste catalyst and thus enabling its further use in the FCC process.

The present invention accomplishes the impregnation of particles of fresh zeolitic crystalline aluminosilicate into the pores of used FCC zeolitic catalytic composite. The fresh zeolite may or may not be the same kine of zeolite originally incorporated into the matrix of the composite during its manufacture, but it is essential that the diameters of the particles of fresh zeolite be smaller than pores contained throughout the matrix of the composite. It is preferred that the composites used have a total volume of pores having sizes in excess of 1000 Angstroms in diameter of over 0.05 ml per gram of composite. The fresh zeolite to be used with such catalyst must, of course, have average particle sizes less than 1000 Angstroms in diameter. The inorganic oxide matrix material of the composite may comprise silica, alumina, zirconia, magnesia, titania or mixtures thereof. The preferred fresh zeolitic crystalline aluminosilicate comprises Y zeolite and it is particularly preferred that this Y-zeolite be cation exchanged with one or more cations selected from the group consisting of hydrogen and rare earth cations. The term "diameter" as used herein, whether with regard to particle size or pore size, is intended to mean the mean diameter of the particle or pore and is defined as six times the volume of the particle divided by its surface area (assuming a spherical shape for particles) or four times the volume of the pore divided by its surface area (assuming a cylindrical shape for pores).

The effectiveness of the present invention lies in the fact that the fresh zeolitic particles are impregnated into and essentially become a part of the used catalytic composite. Thus, the FCC performance characteristics, i.e. activity and selectivity, of the composite itself are altered (improved) rather than just masked by or averaged with the performance of added discrete particles of catalyst as taught in the above discussed prior art. Furthermore, the present invention achieves the added advantage of increasing the activity of only the zeolite constituent of the used catalyst, but not the catalytic activity of the amorphous matrix which also diminishes during use of the catalyst in an FCC process. That is an advantage because the matrix, which in fact provides part of the reactivity of the catalyst, is far less selective with regard to desired products than the zeolite.

The present invention is not intended to apply to a non-zeolitic amorphous FCC catalyst. The zeolite impregnation technique of the present invention is capable of adding enough zeolitic crystalline aluminosilicate to a catalytic composite to increase the zeolite content of the composite from about 0.5 wt. % to 10 wt. %, and most likely will add zeolite in an amount from about 2 to 6 wt. % of the composite. The typical zeolitic FCC catalyst, however, should contain at least 10 wt. % zeolite and as much as 30 wt. % or more. Therefore, the used composite which comprises an ingredient of the catalytic composite of the present invention must already contain a substantial amount of zeolite.

The method of adding the particles of the fresh (second) crystalline aluminosilicate to the used FCC catalytic composite is as described in the following steps:
  (a) a quantity of the composite is placed in an impregnation evaporator,
  (b) an impregnation slurry is prepared by adding the particles of the fresh zeolitic crystalline aluminosilicate to a liquid carrier material;
  (c) the slurry is added to the evaporator;
  (d) heat is applied to the evaporator so as to evaporate the liquid carrier material, thereby effecting the impregnation of the particles into the pores of the composite; and
  (e) the impregnated particles are removed from the evaporator and calcined at proper calcining conditions.

It is essential that the used FCC catalytic composite be passed through the regenerator section prior to being withdrawn from the FCC process for use as taught by this invention. The high carbon content and carbonaceous deposits on unregenerated catalyst would interfere with and probably preclude the practice of the method of the present invention.

The usual impregnation evaporator comprises a jacketed vessel rotating on an axis with the source of heat comprising steam passed into the jacket. It is preferred that sufficient liquid carrier material is used in preparing the zeolitic slurry so as to effect total immersion of the catalytic composite in the evaporator. It is also preferred that the quantity of fresh zeolitic crystalline aluminosilicate added to the liquid to form the slurry is from about 2 to 6 wt. % of the amount of the composite. The preferred liquid carrier material is water and it is recommended, when water is used, that the pH of the slurry be adjusted to above 7.0 by the addition of ammonia prior to the addition of the slurry to the evaporator.

The preferred calcining conditions to which the impregnated catalytic composite is subjected following removal from the evaporator comprises a temperature of from about 200° C. to about 750° C. and a calcining time of from about 30 minutes to about 5 hours. Following calcining alumina sol may be added to the catlytic composite to help bind the zeolite into the catalyst pores.

The following non-limiting examples illustrate a preferred embodiment of the method of making the catalytic composite of the present invention, and the superior results achieved by the catalytic composite of the present invention.

EXAMPLE 1

This example illustrates the treatment of a used FCC catalytic composite in accordance with the method of the present invention. The used catalyst originated as a commercial fresh FCC zeolitic crystalline aluminosilicate containing catalyst (about 20% zeolite) obtained from a major catalyst manufacturer and hereinafter referred to as FC-10. The FC-10 catalyst was used by a major petroleum refining company and is hereinafter referred to as FC-11. The FC-11 catalyst had been regenerated in the regeneration section of the refiner's FCC unit. The catalyst contained 2.4 wt. % volatile matter at 900° C. and had low metal contaminant and coke content. The following data sets forth the pore distribution of both the FC-10 and FC-11 catalysts:

| Pore Diameter (Angstroms) | FC-10 Pore Volume, ml/g | FC-11 Pore Volume, ml/g |
|---|---|---|
| 0–300 | 0.3505 | 0.1817 |
| 300–500 | 0.0150 | 0.0220 |
| 500–1000 | 0.0055 | 0.0291 |
| >1000 | 0.1611 | 0.0703 |

Four hundred grams of the FC-11 catalyst were loaded into a glass rotary impregnation evaporator. An impregnation slurry was prepared by adding 20 grams of rare earth exchanged Y zeolite fines (Union Carbide tradename SK-42) to 700 cc of deionized water. The Y zeolite fines had average particle sizes of about 300 Angstroms. The pH of the surry was adjusted to a pH of 10.5 by adding dilute ammonia solution. The slurry was then added to the glass evaporator. The catalyst was totally immersed in the slurry. Steam was supplied to the outside wall of the evaporator thereby heating the contents thereof, causing the water to evaporate and the catalyst to become impregnated with the zeolite.

The impregnated FCC catalyst was then calcined in a Muffle oven at 600° C. for 2 hours. The resultant catalyst, i.e. the catalytic composite of the present invention, is hereinafter referred to as FC-12. It was determined that the zeolite added to the catalyst by the impregnation amounted to 5 wt. % of the catalyst on a volatile free basis. It was further determined that the impregnation raised the zeolite surface area of the catalyst from 42 to 63 meters$^2$/gram.

EXAMPLE 11

The purpose of this examaple is to present comparative data illustrating the use of FC-10, FC-11 and FC-12 catalysts in an activity and selectivity testing FCC pilot plant. For each test 4 grams (on a volatile free basis) of the catalyst in question was placed in the pilot plant and used to process 1.2 grams of a vacuum gas oil having an API gravity at 60° F. of 28.90 and boiling range of from 500° F. to 800° F. Following are the results of the pilot plant tests.

| Catalyst Code | FC-10 | FC-11 | FC-12 |
|---|---|---|---|
| Reactor temp. °F. | 896 | 896 | 894 |
| WHSV, hr.$^{-1}$ | 14.5 | 14.5 | 15.0 |
| Cat./oil ratio | 3.30 | 3.30 | 3.20 |
| Wt. % conversion | 89.1 | 60.8 | 84.8 |
| Product yield distribution, wt. % | | | |
| C$_3$— | 11.4 | 6.1 | 8.3 |
| C$_4$ | 15.2 | 9.0 | 12.9 |
| C$_5$—EP gasoline | 52.0 | 46.3 | 56.9 |
| B.P. 450+ | 8.1 | 36.4 | 14.6 |
| Spent catalyst carbon | 13.3 | 2.2 | 7.3 |
| Gasoline selectivity | 0.584 | 0.762 | 0.671 |
| Coke selectivity | 0.149 | 0.036 | 0.086 |

From the above data it can be readily seen that the performance of the used FCC catalyst is greatly improved by the method of the present invention. Not only has the activity (expressed in terms of wt. % conversion) increased, and in fact almost completely restored, but, more important in comparing the FC-12 to FC-10 catalysts, the percentage of C$_5$-EP gasoline in the product yield is increased as is gasoline selectivity, while the undesirable coke selectivity has decreased.

I claim as my invention:

1. A process for cracking a hydrocarbon charge stock which comprises contacting said charge stock at cracking conditions with a catalytic composite prepared by impregnating a regenerated used FCC catalytic composite comprising a first zeolitic crystalline aluminosilicate dispersed in a porous inorganic oxide matrix with particles of a second zeolitic crystalline aluminosilicate, the pores of said compoiste having diameter greater than the diameters of said particles of said second zeolitic crystalline aluminosilicate.

2. The process of claim 1 further characterized in that said inorganic oxide comprises silica, alumina, zirconia, magnesia, titania or mixtures thereof.

3. The process of claim 1 further characterized in that the total volume of the pores of said composite having sizes in excess of 1000 Angstroms in diameter is over 0.05 ml per gram of composite and that the average size of said particles of said second zeolitic crystalline aluminosilicate is less than 1000 Angstroms in diameter.

4. The process of claim 1 further characterized in that said second zeolitic crystalline aluminosilicate comprises Y zeolite.

5. The process of claim 4 further characterized in that said Y zeolite is cation exchanged with one or more cations selected from the group consisting of hydrogen and rare earth cations.

6. The process of claim 1 further characterized in that said impregnation of said composite with said particles of said second zeolitic crystalline aluminosilicate is effected by the following steps:

(a) a quantity of said composite is placed in an impregnation evaporator;
(b) an impregnation slurry is prepared by adding said particles of said second zeolitic crystalline aluminosilicate to a liquid carrier material;
(c) said slurry is added to said evaporator;
(d) heat is applied to said evaporator so as to evaporate said liquid carrier material, thereby effecting the impregnation of said particles into said pores of said composite; and
(e) said impregnated particles are removed from said evaporator and calcined at calcining conditions.

7. The process of claim 6 further characterized in that said liquid carrier material comprises water.

8. The process of claim 7 further characterized in that the pH of said impregnation slurry is adjusted, prior to the addition of said slurry to said evaporator, to above 7.0 by the addition of ammonia.

9. The process of claim 6 further characterized in that the quantity of said second zeolitic crystalline aluminosilicate added te to said liquid is from about 2 to 6 wt. % of the amount of said composite and sufficient liquid is used in said slurry to totally immerse said composite in said evaporator.

10. The process of claim 6 further characterized in that said calcining conditions comprise a temperature of from about 200° C. to about 750° C. and a calcining time of from about 30 minutes to about 5 hours.

11. The process of claim 6 further characterized in that said impregnation evaporator comprises a jacketed vessel rotating on an axis and the source of said heat comprises steam passed into said jacket.

* * * * *